US012669959B2

(12) United States Patent
Fan et al.

(10) Patent No.: US 12,669,959 B2
(45) Date of Patent: Jun. 30, 2026

(54) METHOD FOR WRITING DATA TO A SOLID STATE DISK, APPARATUS, AND SOLID STATE DISK

(71) Applicant: SUZHOU METABRAIN INTELLIGENT TECHNOLOGY CO., LTD., Suzhou (CN)

(72) Inventors: Ruichun Fan, Suzhou (CN); Junbo Yin, Suzhou (CN); Wenzheng Qin, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/161,110

(22) PCT Filed: May 24, 2024

(86) PCT No.: PCT/CN2024/095309
§ 371 (c)(1),
(2) Date: Aug. 29, 2025

(87) PCT Pub. No.: WO2024/245159
PCT Pub. Date: Dec. 5, 2024

(65) Prior Publication Data
US 2026/0111145 A1 Apr. 23, 2026

(30) Foreign Application Priority Data
May 26, 2023 (CN) .......................... 202310607939.3

(51) Int. Cl.
*G06F 3/06* (2006.01)
(52) U.S. Cl.
CPC .......... *G06F 3/0656* (2013.01); *G06F 3/0611* (2013.01); *G06F 3/0679* (2013.01)

(58) Field of Classification Search
CPC ..... G06F 3/0656; G06F 3/0611; G06F 3/0679
See application file for complete search history.

(56) References Cited

U.S. PATENT DOCUMENTS 11,507,499 B2 * 11/2022 Li ............................ G06F 3/067
11,874,775 B2 * 1/2024 Byun .................. G06F 12/1072
(Continued)

FOREIGN PATENT DOCUMENTS

CN 107209719 A 9/2017
CN 111694770 A 9/2020
(Continued)

OTHER PUBLICATIONS

Zhao, Jianming et al., "A novel cache replacement algorithm for iSCSI storage". Computer Engineering and Science, vol. 35, No. 6. Jun. 15, 2013 (Jun. 15, 2013).
(Continued)

*Primary Examiner* — Sean D Rossiter
(74) *Attorney, Agent, or Firm* — Scully, Scott, Murphy & Presser, P.C.

(57) ABSTRACT

Provided is a method for writing data to a Solid State Disk (SSD), an apparatus and the SSD. According to the method, a Logical Block Address (LBA) of each of a plurality of pieces of written data stored into a target cache module is acquired to obtain a plurality of Logical Block Addresses (LBAs); the plurality of pieces of written data in the buffer is stored into a solid-state storage unit of the SSD; whether the plurality of LBAs are consecutive is determined to obtain a determination result. In a case where the determination result indicates that the plurality of LBAs are consecutive, a Physics Block Address (PBA) of each of the plurality of pieces of written data in the solid-state storage unit is acquired to obtain a plurality of PBAs and a target (Continued)

mapping table according to the plurality of LBAs and the plurality of PBAs is generated.

20 Claims, 4 Drawing Sheets

(56)                    References Cited

U.S. PATENT DOCUMENTS

| | | | |
|---|---|---|---|
| 2020/0065241 A1 | 2/2020 | Cho | |
| 2020/0117594 A1* | 4/2020 | Zhang | G11C 5/04 |
| 2023/0205458 A1* | 6/2023 | Kim | G06F 3/0659 |
| | | | 711/154 |
| 2023/0367718 A1* | 11/2023 | Hanna | G06F 12/1009 |
| 2024/0094912 A1* | 3/2024 | Liang | G06F 3/0659 |
| 2025/0217076 A1* | 7/2025 | Kang | G06F 3/0679 |

FOREIGN PATENT DOCUMENTS

| | | | |
|---|---|---|---|
| CN | 112486852 A | 3/2021 | |
| CN | 116340198 A | 6/2023 | |

OTHER PUBLICATIONS

The search report of PCT application No. PCT/CN2024/095309 issued on Jul. 20, 2024.
The search report of CN application No. 202310607939.3 issued on Jul. 5, 2023.

* cited by examiner

Fig. 2

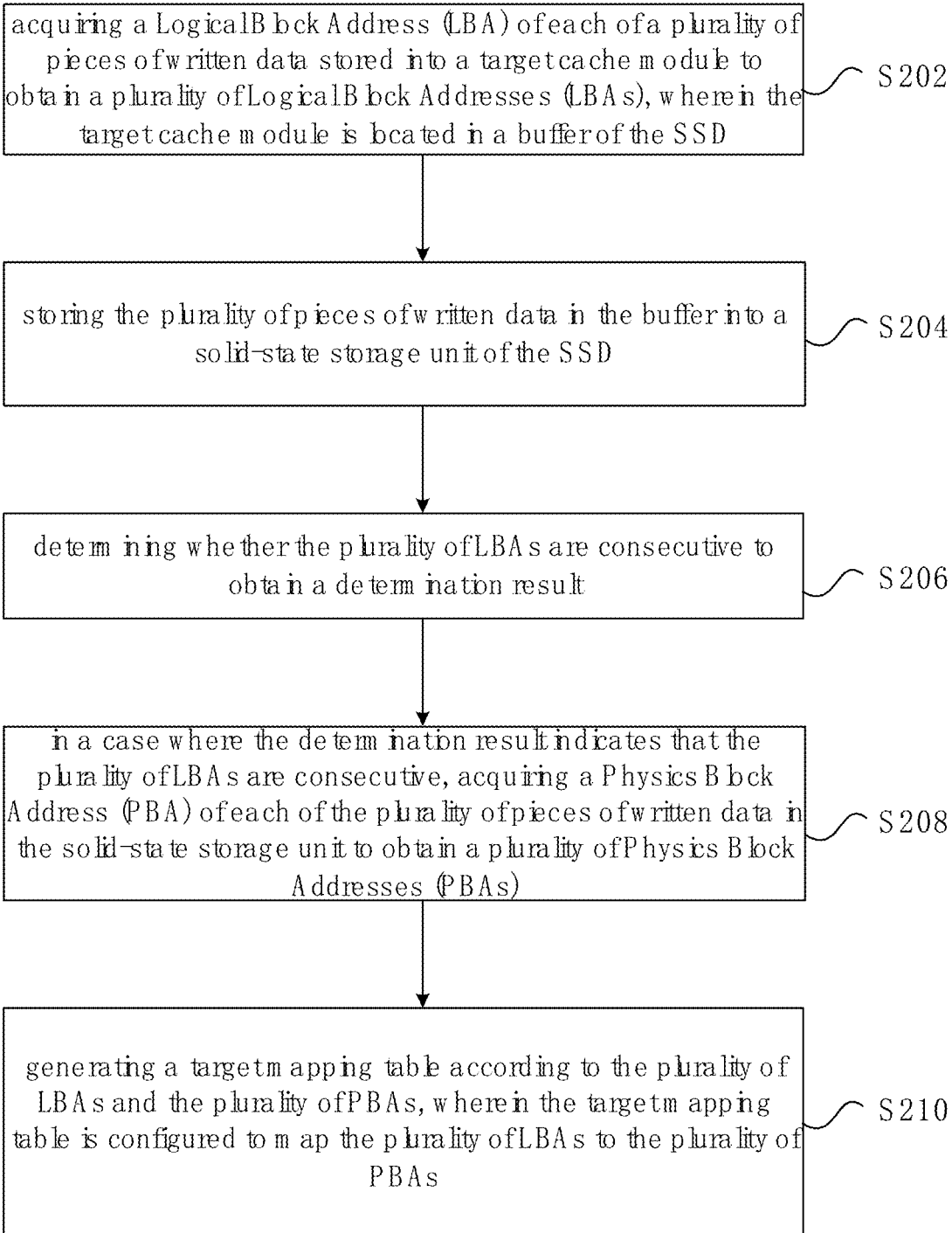

acquiring a Logical Block Address (LBA) of each of a plurality of pieces of written data stored into a target cache module to obtain a plurality of Logical Block Addresses (LBAs), wherein the target cache module is located in a buffer of the SSD     ⌒ S202 storing the plurality of pieces of written data in the buffer into a solid-state storage unit of the SSD     ⌒ S204 determining whether the plurality of LBAs are consecutive to obtain a determination result     ⌒ S206 in a case where the determination result indicates that the plurality of LBAs are consecutive, acquiring a Physics Block Address (PBA) of each of the plurality of pieces of written data in the solid-state storage unit to obtain a plurality of Physics Block Addresses (PBAs)     ⌒ S208 generating a target mapping table according to the plurality of LBAs and the plurality of PBAs, wherein the target mapping table is configured to map the plurality of LBAs to the plurality of PBAs     ⌒ S210

METHOD FOR WRITING DATA TO A SOLID STATE DISK, APPARATUS, AND SOLID STATE DISK

CROSS-REFERENCE TO RELATED APPLICATION

This application claims priority to Chinese Patent Application No. 202310607939.3, filed to the China National Intellectual Property Administration on May 26, 2023 and entitled "Method for Writing Data to a Solid State Disk, Apparatus, and Solid State Disk", the disclosure of which is hereby incorporated by reference in its entirety.

TECHNICAL FIELD

Embodiments of the present disclosure relate to the field of computers, and in particular, to method for writing data to a Solid State Disk, apparatus, and the SSD.

BACKGROUND

A mapping table (Logical-to-Physical (L2P) table) needs to be modified twice in the data writing process of an SSD. The first time is when data is transferred from a host to a buffer of a Dynamic Random Access Memory (DRAM) in the SSD, a Data Management (DM) module needs to point the L2P table to a buffer address where the data is located. The second time is after the data is written from the buffer to a flash (NAND flash), a Write Management (WM) module needs to point the L2P table to an NAND address.

In the related art, each time the DM module processes a piece of data, a cache entry, which is configured to record the buffer address and a Logical Block Address (LBA), may be generated and updated to the L2P table. The data of a Cache Control Block (CCB) is processed and then sent to the WM module to perform data writing and table modification operations of the NAND flash. The WM module performs the table modification operation by iterating through each cache entry in the CCB. In the above table modification operation, each time the cache entry is written, it is necessary to iterate through each cache entry in the CCB and read the LBA from the DRAM for comparison to finally determine whether the LBAs in the CCB are consecutive. This large amount of cycle determinations and accesses to the DRAM greatly affect the write operation performance of the SSD.

SUMMARY

Embodiments of the present disclosure provide a method for writing data to a SSD, an apparatus, and the SSD, so as to at least solve the problem in the related art of poor write operation performance of the SSD.

According to one embodiment of the present disclosure, a method for writing data to a SSD is provided, comprising: acquiring a Logical Block Address (LBA) of each of a plurality of pieces of written data stored into a target cache module to obtain a plurality of Logical Block Addresses (LBAs), wherein the target cache module is located in a buffer of the SSD; storing the plurality of pieces of written data in the buffer into a solid-state storage unit of the SSD; determining whether the plurality of LBAs are consecutive to obtain a determination result; in a case where the determination result indicates that the plurality of LBAs are consecutive, acquiring a Physics Block Address (PBA) of each of the plurality of pieces of written data in the solid-state storage unit to obtain a plurality of Physics Block Addresses (PBAs); and generating a target mapping table according to the plurality of LBAs and the plurality of PBAs, wherein the target mapping table is configured to map the plurality of LBAs to the plurality of PBAs.

In one exemplary embodiment, the acquiring a LBA of each of a plurality of pieces of written data stored into a target cache module to obtain a plurality of LBAs, wherein the target cache module is located in a buffer of the SSD, comprises: acquiring, from a host, a data packet carried by a target command, and a LBA of each of a plurality of pieces of data in the data packet; storing the data packet and the LBA of each of the plurality of pieces of data in the data packet into at least one cache module in the buffer, wherein the at least one cache module comprises the target cache module; and acquiring a LBA of each of a plurality of pieces of data stored into the target cache module to obtain the plurality of LBAs.

In one exemplary embodiment, the above method further comprises: splitting the plurality of pieces of data in the data packet one by one to obtain a plurality of pieces of unpacked data; determining, according to a splitting order of the plurality of pieces of unpacked data, whether a LBA of a target piece of unpacked data among the plurality of pieces of unpacked data and a LBA of a previous piece of unpacked data are consecutive to obtain the determination result; and generating a target marking parameter of the target cache module according to the determination result, wherein the target marking parameter is configured to indicate whether the LBA of the target piece of unpacked data and the LBA of the previous piece of unpacked data are consecutive.

In one exemplary embodiment, the determining, according to a splitting order of the plurality of pieces of unpacked data, whether a LBA of a target piece of unpacked data among the plurality of pieces of unpacked data and a LBA of a previous piece of unpacked data are consecutive to obtain the determination result comprises: determining, according to the splitting order of the plurality of pieces of unpacked data, whether a LBA of the Nth piece of unpacked data among the plurality of pieces of unpacked data and a LBA of the (N−1)th piece of unpacked data among the plurality of pieces of unpacked data are consecutive to obtain the determination result.

In one exemplary embodiment, the generating a target marking parameter of the target cache module according to the determination result comprises: updating, according to the determination result, a previous marking parameter of the target cache module to the target marking parameter, wherein the previous marking parameter is configured to indicate whether the LBA of the (N−1)th piece of unpacked data among the plurality of pieces of unpacked data and a LBA of the (N−2)th piece of unpacked data among the plurality of pieces of unpacked data are consecutive.

In one exemplary embodiment, the updating, according to the determination result, a previous marking parameter of the target cache module to the target marking parameter comprises: in a case where a first determination result is obtained, generating a first marking parameter according to the first determination result, and updating the previous marking parameter to the first marking parameter, wherein the first determination result is the determination result obtained in a case where the LBA of the Nth piece of unpacked data and the LBA of the (N−1)th piece of unpacked data are consecutive; and in a case where a second determination result is obtained, generating a second marking parameter according to the second determination result, and updating the previous marking parameter to the second marking parameter, wherein the second determination result is the determination result obtained in a case where the LBA of the Nth piece of unpacked data and the LBA of the (N−1)th piece of unpacked data are not consecutive.

In one exemplary embodiment, the splitting the plurality of pieces of data in the data packet one by one to obtain a plurality of pieces of unpacked data comprises: splitting the plurality of pieces of data in the data packet one by one to obtain the plurality of pieces of unpacked data of the same size.

In one exemplary embodiment, the storing the data packet and the LBA of each of the plurality of pieces of data in the data packet into at least one cache module in the buffer comprises: storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data.

In one exemplary embodiment, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data comprises: storing the target piece of unpacked data and the LBA of the target piece of unpacked data into the target cache module; determining whether a quantity of unpacked data currently stored into the target cache module reaches the preset quantity; in a case where the quantity of unpacked data currently stored into the target cache module does not reach the preset quantity, storing, according to the splitting order of the plurality of pieces of unpacked data, a next piece of unpacked data of the target piece of unpacked data and a LBA of the next piece of unpacked data into the target cache module; and in a case where the quantity of unpacked data currently stored into the target cache module reaches the preset quantity, stopping a storage operation of the target cache module, the target cache module storing the plurality of pieces of written data.

In one exemplary embodiment, the storing the data packet and the LBA of each of the plurality of pieces of data in the data packet into at least one cache module in the buffer further comprises: determining the present quantity according to a storage capacity of the target cache module and a size of each of the plurality of pieces of unpacked data.

In one exemplary embodiment, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data, comprises: determining, after a piece of unpacked data is split out from the plurality of pieces of data in the data packet each time, whether an available cache module exists in the at least one cache module, wherein the available cache module is a cache module having available storage space; in a case where the available cache module exists in the at least one cache module, determining that the available cache module is the target cache module; and storing the piece of unpacked data split out from the plurality of pieces of data in the data packet and a LBA of the piece of unpacked data into the target cache module, wherein the plurality of pieces of written data comprise the stored the piece of unpacked data and the stored LBA of the piece of unpacked data.

In one exemplary embodiment, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data further comprises: in a case where the available cache module does not exist in the at least one cache module, generating an application request; generating, according to the application request, a new cache module in the buffer to obtain the target cache module; and storing the unpacked data split out from the plurality of pieces of data in the data packet into the new cache module to obtain written data stored in the target cache module.

In one exemplary embodiment, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data further comprises: after generating the new cache module, initializing the new cache module to obtain the target cache module, wherein the target cache module has a first marking parameter, and the first marking parameter is configured to indicate that the plurality of LBAs are consecutive.

In one exemplary embodiment, the determining, according to a splitting order of the plurality of pieces of unpacked data, whether a LBA of a target piece of unpacked data among the plurality of pieces of unpacked data and a LBA of a previous piece of unpacked data are consecutive to obtain the determination result comprises: after storing the target piece of unpacked data split out from the plurality of pieces of data in the data packet and the LBA of the target piece of unpacked data into the target cache module, recording a relative offset parameter of the target piece of unpacked data in the target cache module, wherein the relative offset parameter indicates the quantity of pieces of unpacked data stored in the target cache module before the target piece of unpacked data in a storing order; calculating a difference between the LBA of the target piece of unpacked data and a LBA of the first piece of unpacked data stored in the target cache module; and determining whether the relative offset parameter is equal to the difference to obtain the determination result.

In one exemplary embodiment, the generating a target marking parameter of the target cache module according to the determination result comprises: generating a first marking parameter in a case where the relative offset parameter is equal to the difference, wherein the first marking parameter is configured to indicate that the plurality of LBAs are consecutive; and generating a second marking parameter in a case where the relative offset parameter is not equal to the difference, wherein the second marking parameter is configured to indicate that a LBA of a first piece of written data among the plurality of pieces of written data and a LBA of a second piece of written data among the plurality of pieces of written data are not consecutive, and the first write data and the second write data are two pieces of unpacked data adjacent in the splitting order.

In one exemplary embodiment, the determining whether the plurality of LBAs are consecutive comprises: determining whether the target marking parameter indicates that the plurality of LBAs are consecutive.

In one exemplary embodiment, the determining whether the target marking parameter indicates that the plurality of LBAs are consecutive comprises: determining whether the target marking parameter meets a preset condition, wherein the preset condition comprises one of the following: the target marking parameter is the first marking parameter, wherein the first marking parameter is configured to indicate that the plurality of LBAs are consecutive; the target marking parameter is the second marking parameter, wherein the second marking parameter is configured to indicate that the plurality of LBAs are not consecutive.

In one exemplary embodiment, the above method further comprises: acquiring a PBA of each of the plurality of pieces of written data in the buffer to obtain a plurality of PBAs which comprise the PBA of each of the plurality of pieces of written data in the buffer; and generating a first mapping table according to the plurality of LBAs and the plurality of PBAs which comprise the PBA of each of the plurality of pieces of written data in the buffer, wherein the first mapping table is configured to map the plurality of LBAs to the plurality of PBAs which comprise the PBA of each of the plurality of pieces of written data in the buffer.

In one exemplary embodiment, the generating a target mapping table according to the plurality of LBAs and the plurality of PBAs comprises: updating the first mapping table according to the plurality of PBAs which comprise the PBA of each of the plurality of pieces of written data in the solid-state storage unit to obtain the target mapping table.

According to another embodiment of the present disclosure, an apparatus for writing data to a SSD is provided, comprising: a first acquisition module, configured to acquire a Logical Block Address (LBA) of each of a plurality of pieces of written data stored into a target cache module to obtain a plurality of Logical Block Addresses (LBAs), wherein the target cache module is located in a buffer of the SSD; a storage module, configured to the plurality of pieces of written data in the buffer into a solid-state storage unit of the SSD; a determination module, configured to determine whether the plurality of LBAs are consecutive to obtain a determination result; a second acquisition module, configured to, in a case where the determination result indicates that the plurality of LBAs are consecutive, acquire a Physics Block Address (PBA) of each of the plurality of pieces of written data in the solid-state storage unit to obtain a plurality of Physics Block Addresses (PBAs); and a generation module, configured to a target mapping table according to the plurality of LBAs and the plurality of PBAs, wherein the target mapping table is configured to map the plurality of LBAs to the plurality of PBAs.

According to still another embodiment of the present disclosure, a non-volatile readable storage medium is further provided, in which a computer program is stored. The computer program is configured to execute the steps in any one of the above method embodiments when running.

According to still another embodiment of the present disclosure, an SSD is further provided, comprising a memory and a processor. A computer program is stored in the memory, and the processor is configured to run the computer program to execute the steps in any of the above method embodiments.

Through the present disclosure, after the LBAs of the plurality of pieces of written data stored into the target cache module are acquired, and the plurality of pieces of written data in the buffer are stored into the solid-state storage unit of the SSD, it is first determined whether the LBAs of the plurality of pieces of written data are consecutive, and in a case where the LBAs of the plurality of pieces of written data are consecutive, the PBAs of the plurality of pieces of written data in the solid-state storage unit are acquired. Therefore, based on the characteristic that the LBAs in the CCB in the write operation process of the SSD are consecutive, and the characteristic that the data packet carried by the command needs to be split into the plurality of pieces of written data for processing in the write operation process, it is first identified whether the LBAs in the CCB are consecutive, if so, there is no need to iterate through each piece of write data and the LBA thereof in the CCB, and there is no need to read the LBA from the DRAM each time for comparison, but the above mapping table may be directly generated at one time using the LBAs in the CCB. Therefore, the problem in the related art that a large number of cycle determinations and accesses to the DRAM greatly affect the write operation performance of the SSD may be solved, and the effect of improving the write operation performance of the SSD may be achieved.

BRIEF DESCRIPTION OF THE DRAWINGS

FIG. 2 is a flowchart of a method for writing data to a SSD according to an embodiment of the present disclosure.

DETAILED DESCRIPTION OF THE EMBODIMENTS

Embodiments of the present disclosure are described below with reference to the drawings and in conjunction with the embodiments in detail.

It is to be noted that the terms "first", "second" and the like in the specification, claims and the above drawings of the present disclosure are used for distinguishing similar objects rather than describing a specific sequence or a precedence order.

Figure 1:
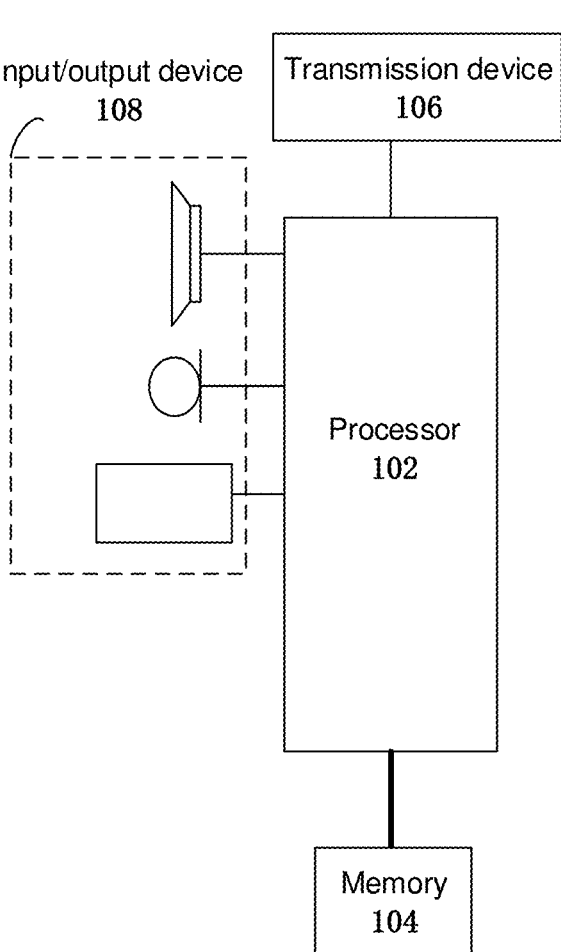
FIG. 1 is a block diagram of a hardware structure of an SSD for performing a method for writing data to a SSD provided in an embodiment of the present disclosure.

The method embodiment provided by the embodiments of the present disclosure may be performed in an SSD. FIG. 1 is a block diagram of a hardware structure of an SSD according to an embodiment of the present disclosure. As shown in FIG. 1, the SSD may include one or more (only one is shown in FIG. 1) processors 102 (the processors 102 may include, but are not limited to, processing apparatuses such as a Micro Controller Unit (MCU) or a Field Programmable Gate Array (FPGA) and a memory 104 for storing data. The above SSD may further include a transmission device 106 and an input/output device 108 for communication functions. Those of ordinary skill in the art may understand that the structure shown in FIG. 1 is only schematic and not intended to limit the above SSD. For example, the SSD may further include more or fewer components than those shown in FIG. 1, or have a different configuration from that shown in FIG. 1.

The memory 104 may be configured to store a computer program, for example, a software program or a module of application software, such as a computer program corresponding to a method for writing data to a SSD in the embodiments of the present disclosure. The processor 102 runs the computer program stored in the memory 104 to perform various functional applications and data processing, that is, to implement the above method. The memory 104 may include a high speed Random Access Memory (RAM) and may further include a non-volatile memory such as one or more magnetic storage apparatuses, a flash, or other non-volatile solid state memories. In some examples, the memory 104 may further include memories remotely located relative to the processor 102, which may be connected to the SSD over a network. Examples of the above network include, but are not limited to, the Internet, the Intranet, a local area network, a mobile communication network, and a combination thereof.

The transmission device 106 is configured to receive or transmit data through a network. The above optional examples of the network may include a wireless network provided by a communication provider of the SSD. In one example, the transmission device 106 comprises a Network Interface Controller (NIC) that may be connected to other network devices through a base station to communicate with the Internet. In one example, the transmission device 106 may be a Radio Frequency (RF) module, which is configured to communicate with the Internet in a wireless manner.

In the present embodiment, a method for writing data running on the above SSD is provided. FIG. 2 is a flowchart of a method for writing data to a SSD according to an embodiment of the present disclosure. As shown in FIG. 2, the process comprises the following steps.

At S202, acquiring a Logical Block Address (LBA) of each of a plurality of pieces of written data stored into a target cache module to obtain a plurality of Logical Block Addresses (LBAs), wherein the target cache module is located in a buffer of the SSD.

At S204, storing the plurality of pieces of written data in the buffer into a solid-state storage unit of the SSD.

At S206, determining whether the plurality of LBAs are consecutive to obtain a determination result.

At S208, in a case where the determination result indicates that the plurality of LBAs are consecutive, acquiring a Physics Block Address (PBA) of each of the plurality of pieces of written data in the solid-state storage unit to obtain a plurality of Physics Block Addresses (PBAs).

At S210, generating a target mapping table according to the plurality of LBAs and the plurality of PBAs, wherein the target mapping table is configured to map the plurality of LBAs to the plurality of PBAS.

It is to be noted that the above method for writing data for the SSD in the present embodiment is applied to sequential write of the SSD, and sequential write may be understood as collecting and queuing data to be processed, and performing consecutive writing at an optimized speed. Usually, a relatively ideal sequential write speed may be acquired when a large file is written. Generally speaking, sequential write indicates that the SSD works in the order of data in the data writing process, and has the characteristic of data writing continuity, which is manifested in a short writing time and continuity.

In the related art, each time a DM module processes a piece of data, a cache entry, which is configured to record a buffer address and an LBA, may be generated and updated to the L2P table. The data of a CCB is processed and then sent to a WM module to perform data writing and table modification operations of a flash (NAND flash). The WM module performs the table modification operation by iterating through each cache entry in the CCB.

When the DM module receives a write operation command, the DM module needs to split the data in the data packet carried by the command into a plurality of 4 KB, send the LBA corresponding to one 4 KB to the WM module each time, the WM module allocates the PBA to the LBA according to the received LBA, and then the WM module writes data into the NAND according to the PBA, and points the L2P table to an NAND address through the table modification operation.

However, in the above table modification operation, each time the cache entry is written, it is necessary to iterate through each cache entry in the CCB and read the LBA from a DRAM for comparison to finally determine whether the LBAs in the CCB are consecutive. This large amount of cycle determinations and accesses to the DRAM greatly affect the sequential write performance of the SSD.

Taking NAND flash technology architecture as a Triple-Level Cell (TLC) storage technology as an example, in the SSD, the smallest unit of data storage is a page. The size of one page is usually 4 KB, and a plurality of pages are combined into blocks. One CCB can carry 3 pages of data, that is, 12 pieces of 4 KB data. When the WM module modifies the table, the WM module iterates through each cache entry in the CCB. The consecutive LBAs may complete the table modification at one time, but even if the 12 LBAs in the CCB are consecutive, it is still necessary to iterate through 12 times, and it is necessary to read the LBA from the DRAM for comparison to finally determine whether these 12 LBAs are consecutive.

In the present embodiment, through S202 to S210, based on the characteristic that the LBAs in the CCB in the write operation process of the SSD are consecutive, and the characteristic that the data packet carried by the command needs to be split into the plurality of pieces of written data for processing in the write operation process, it is first identified whether the LBAs in the CCB are consecutive, if so, there is no need to iterate through each piece of write data and the LBA thereof in the CCB, and there is no need to read the LBA from the DRAM each time for comparison, but the above mapping table may be directly generated at one time using the LBAs in the CCB. Therefore, the problem in the related art that a large number of cycle determinations and accesses to the DRAM greatly affect the write operation performance of the SSD may be solved, and the effect of improving the write operation performance of the SSD may be achieved.

In S202, acquiring a Logical Block Address (LBA) of each of a plurality of pieces of written data stored into a target cache module to obtain a plurality of Logical Block Addresses (LBAs), wherein the target cache module is located in a buffer of the SSD.

In some optional implementations, the acquiring a LBA of each of a plurality of pieces of written data stored into a target cache module to obtain a plurality of LBAs, wherein the target cache module is located in a buffer of the SSD, comprises: acquiring, from a host, a data packet carried by a target command, and a LBA of each of a plurality of pieces of data in the data packet; storing the data packet and the LBA of each of the plurality of pieces of data in the data packet into at least one cache module in the buffer, wherein the at least one cache module comprises the target cache module; and acquiring a LBA of each of a plurality of pieces of data stored into the target cache module to obtain the plurality of LBAs.

In some embodiments, a control unit in the SSD comprises the DM module and the WM module, the host sends the data packet carried by the target command to the DM module, the DM module may split the data packet carried by the command to obtain a plurality of pieces of 4 KB data and the LBA of each piece of 4 KB data, and then sequentially store the 4 KB data and the LBA thereof into the buffer of the DRAM in the SSD. The buffer may include a plurality of CCBs, each of which may carry 12 pieces of 4 KB data, so that the LBAs of the plurality of pieces of 4 KB data stored into the CCB may be acquired through the WM module.

In some optional implementations, the method for writing data in the present embodiment further comprises: acquiring a PBA of each of the plurality of pieces of written data in the buffer to obtain a plurality of PBAs which comprise the PBA of each of the plurality of pieces of written data in the buffer; and generating a first mapping table according to the plurality of LBAs and the plurality of PBAs which comprise the PBA of each of the plurality of pieces of written data in the buffer, wherein the first mapping table is configured to map the plurality of LBAs to the plurality of PBAs which comprise the PBA of each of the plurality of pieces of written data in the buffer.

In some embodiments, the L2P table needs to be modified twice in the data writing process of the SSD. The first time is when the data is transferred from the host to the buffer of the DRAM in the SSD, the DM module points the L2P table to the buffer address where the data is located by modifying the table, that is, the above first mapping table for mapping the LBAs of the plurality of pieces of written data to the PBAs in the buffer is obtained.

In some optional implementations, the method for writing data in the present embodiment further comprises: splitting the plurality of pieces of data in the data packet one by one to obtain a plurality of pieces of unpacked data; determining, according to a splitting order of the plurality of pieces of unpacked data, whether a LBA of a target piece of unpacked data among the plurality of pieces of unpacked data and a LBA of a previous piece of unpacked data are consecutive to obtain the determination result; and generating a target marking parameter of the target cache module according to the determination result, wherein the target marking parameter is configured to indicate whether the LBA of the target piece of unpacked data and the LBA of the previous piece of unpacked data are consecutive.

In some embodiments, the DM module may split the data packet carried by the command to obtain the plurality of pieces of unpacked data, and then sequentially determine, according to the splitting order of the data, whether the LBA of a piece of unpacked data and the LBA of the previous piece of unpacked data are consecutive, so that the DM module may identify whether the LBAs in one CCB are consecutive in the unpacking process. Once identified, the DM module directly informs the WM module of the continuity of the LBAs in the CCB through the marking parameter, so that when the WM module modifies the table, the WM module may first determine whether the LBAs are consecutive according to the above marking parameter, if so, the WM module does not need to make a cycle determination gain, and directly completes the table modification at one time, otherwise the L2P table is pointed to the NAND address by modifying the table according to the method in the related art.

The present embodiment uses the above optional implementation, and by performing optimization processing on the table modification solution of SSD data writing, a large number of cycle determinations of the WM module are hidden in the unpacking process of the DM module, thereby greatly reducing the number of cycle determinations of the WM module and accesses to the DRAM, reducing the operation pressure of the WM module, and improving the sequential write performance.

Exemplarily, the target marking parameter is indicated by adding a flag field to the CCB, and the added flag is configured to indicate whether the LBAs in the CCB are consecutive. At the same time, a first_lba field is added to the CCB to record the LBA corresponding to the first piece of data stored in the CCB.

In some optional implementations, the splitting the plurality of pieces of data in the data packet one by one to obtain a plurality of pieces of unpacked data comprises: splitting the plurality of pieces of data in the data packet one by one to obtain the plurality of pieces of unpacked data of the same size.

Exemplarily, the DM module may split the data packet carried by the command to obtain the plurality of pieces of 4 KB data, and then sequentially determine, according to the data splitting order, whether the LBA of a piece of 4 KB data and the LBA of the previous piece of 4 KB data are consecutive, so that the DM module may identify whether the LBAs in one CCB are consecutive in the unpacking process of each piece of 4 KB data.

In some optional implementations, the determining, according to a splitting order of the plurality of pieces of unpacked data, whether a LBA of a target piece of unpacked data among the plurality of pieces of unpacked data and a LBA of a previous piece of unpacked data are consecutive to obtain the determination result comprises: determining, according to the splitting order of the plurality of pieces of unpacked data, whether a LBA of the Nth piece of unpacked data among the plurality of pieces of unpacked data and a LBA of the (N−1)th piece of unpacked data among the plurality of pieces of unpacked data are consecutive to obtain the determination result, and updating, according to the determination result, a previous marking parameter of the target cache module to the target marking parameter, wherein the previous marking parameter is configured to indicate whether the LBA of the (N−1)th piece of unpacked data among the plurality of pieces of unpacked data and a LBA of the (N−2)th piece of unpacked data among the plurality of pieces of unpacked data are consecutive.

In some embodiments, after splitting the data packet to obtain the plurality of pieces of 4 KB data, the DM module sequentially stores the 4 KB data into the CCB to complete the processing of a piece of 4 KB data. In the unpacking process of each piece of 4 KB data, the DM module sequentially determines, according to the splitting order of the data, whether the LBA of a piece of 4 KB data and the LBA of the previous piece of 4 KB data are consecutive, thereby generating different marking parameters according to whether the LBAs are consecutive. When the same CCB is allocated to the plurality of pieces of 4 KB data, it is determined whether the LBA of a piece of 4 KB data and the LBA of the previous piece of 4 KB data are consecutive to generate the marking parameter corresponding to the CCB, and in a case where the CCB is not fully stored, the marking parameter of the CCB is updated at any time to obtain the above target marking parameter.

In some embodiments, in a case where the LBA of the Nth piece of unpacked data and the LBA of the (N−1)th piece of unpacked data are consecutive, the obtained determination result may be a first determination result, so that generating a first marking parameter according to the first determination result, and updating the previous marking parameter to the first marking parameter. In a case where the LBA of the Nth piece of unpacked data and the LBA of the (N−1)th piece of unpacked data are not consecutive, the obtained determination result may be a second determination result, so that generating a second marking parameter according to the second determination result, and updating the previous marking parameter to the second marking parameter.

Exemplarily, after the DM module transfers the data packet from the host to the buffer, the DM module starts updating the cache entry, modifies the L2P table, and then determines a value of the flag corresponding to the CCB when the plurality of pieces of 4 KB data are sequentially stored in the CCB. Each time a piece of 4 KB data is processed, it is necessary to determine whether the CCB is fully stored, if so, the CCB is directly sent to the WM module, otherwise the CCB is sent to the WM module after being fully stored. When the WM module finishes writing the data and modifies the table, the WM module first determines the flag in the CCB. If the flag is 1, 12 old PBAs may be read from the L2P table at one time. After a new PBA is generated, 12 new PBAs may be updated to the L2P table at one time. In this way, the WM module may reduce 12 cycle and comparison determinations when processing each CCB, which greatly reduces the operation pressure of the WM module.

If the value of the flag is 0, it indicates that the LBAs in the CCB are not consecutive, the DM module informs the WM module of the flag, and when the WM module finds that the flag in the CCB is 0, the WM module continues to perform the above table modification operation according to the related art, first iterating through and determining, and modifying the table once every time a maximum consecutive LBA is found until the table with 12 pieces of 4 KB data is modified.

If the value of the flag is 1, it indicates that the LBAs in the CCB are consecutive, the DM module determines, according to the splitting order of the data, whether the LBA of a piece of 4 KB data and the LBA of the previous piece of 4 KB data are consecutive, and the first piece of 4 KB data in each CCB is configured to apply for the CCB, and others do not need to be applied for. The CCB applied for by the first piece of 4 KB data is directly used, and other CCBs are used sequentially thereafter. When the first CCB applies for the CCB, the flag corresponding to the CCB is set to 1, which indicates that the LBAs of 12 pieces of 4 KB data in the CCB are consecutive by default. At the same time, the first_lba field in the DM module is set to the LBA corresponding to the first piece of 4 KB data. When the CCB is allocated to each piece of 4 KB data, if the LBA of the 4 KB data and the LBA of the previous piece of 4 KB data are consecutive, the flag corresponding to the CCB is still set to 1, and if the LBA of the 4 KB data and the previous piece of 4 KB data are not consecutive, the flag corresponding to the CCB is set to 0.

In some optional implementations, the storing the data packet and the LBA of each of the plurality of pieces of data in the data packet into at least one cache module in the buffer comprises: storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data.

In some embodiments, each time a piece of 4 KB data is processed, the quantity of 4 KB data stored in the CCB may be used to determine whether the CCB is fully stored, if so, the CCB is directly sent to the WM module, otherwise the CCB is sent to the WM module after being fully stored.

In one optional implementation, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data comprises: storing the target piece of unpacked data and the LBA of the target piece of unpacked data into the target cache module; determining whether a quantity of unpacked data currently stored into the target cache module reaches the preset quantity; in a case where the quantity of unpacked data currently stored into the target cache module does not reach the preset quantity, storing, according to the splitting order of the plurality of pieces of unpacked data, a next piece of unpacked data of the target piece of unpacked data and a LBA of the next piece of unpacked data into the target cache module; and in a case where the quantity of unpacked data currently stored into the target cache module reaches the preset quantity, stopping a storage operation of the target cache module, the target cache module storing the plurality of pieces of written data.

In the above optional implementation, the storing the data packet and the LBA of each of the plurality of pieces of data in the data packet into at least one cache module in the buffer further comprises: determining the present quantity according to a storage capacity of the target cache module and a size of each of the plurality of pieces of unpacked data.

Exemplarily, one CCB can carry 3 pages of data, i.e., 12 pieces of 4 KB data. Therefore, the preset quantity is set to 12, and each time a piece of 4 KB data is processed, it may be determined whether the quantity of 4 KB data currently stored into the CCB reaches 12. If the quantity is not reached, it is determined that the CCB is not fully stored, the next piece of 4 KB data is sorted out, and after knowing that the 4 KB data is fully stored into the CCB, the CCB is sent to the WM module. If the quantity is reached, it is determined that the CCB is fully stored, and the CCB is directly sent to the WM module.

In some optional implementations, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data, comprises: determining, after a piece of unpacked data is split out from the plurality of pieces of data in the data packet each time, whether an available cache module exists in the at least one cache module, wherein the available cache module is a cache module having available storage space; in a case where the available cache module exists in the at least one cache module, determining that the available cache module is the target cache module; and storing the piece of unpacked data split out from the plurality of pieces of data in the data packet and a LBA of the piece of unpacked data into the target cache module, wherein the plurality of pieces of written data comprise the stored the piece of unpacked data and the stored LBA of the piece of unpacked data.

In some embodiments, after a piece of 4 KB data is split, it is determined whether the available CCB exists in the current buffer, if so, the existing CCB is directly used, and a relative offset of the 4 KB data in the CCB is recorded as cache_entry_offset, which takes a value between 0 and 11.

In some optional implementations, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data further comprises: in a case where the available cache module does not exist in the at least one cache module, generating an application request; generating, according to the application request, a new cache module in the buffer to obtain the target cache module; and storing the unpacked data split out from the plurality of pieces of data in the data packet into the new cache module to obtain written data stored in the target cache module.

In the above optional implementation, the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data further comprises: after generating the new cache module, initializing the new cache module to obtain the target cache module, wherein the target cache module has a first marking parameter, and the first marking parameter is configured to indicate that the plurality of LBAs are consecutive.

In some embodiments, after a piece of 4 KB data is split, it is determined whether the available CCB exists in the current buffer, and if not, a new CCB is applied for, that is, the first piece of 4 KB data in each CCB is used to apply for the CCB, and others do not need to apply. The CCB applied for by the first piece of 4 KB data is directly used, and other CCBs are used sequentially thereafter. When the first piece of 4 KB data applies for the CCB, the flag value is set to 1, which indicates that the LBAs of 12 pieces of 4 KB data in the CCB are consecutive by default. At the same time, the first_lba is set to the LBA corresponding to the first piece of 4 KB data.

In some optional implementations, the determining, according to a splitting order of the plurality of pieces of unpacked data, whether a LBA of a target piece of unpacked data among the plurality of pieces of unpacked data and a LBA of a previous piece of unpacked data are consecutive to obtain the determination result comprises: after storing the target piece of unpacked data split out from the plurality of pieces of data in the data packet and the LBA of the target piece of unpacked data into the target cache module, recording a relative offset parameter of the target piece of unpacked data in the target cache module, wherein the relative offset parameter indicates the quantity of pieces of unpacked data stored in the target cache module before the target piece of unpacked data in a storing order; calculating a difference between the LBA of the target piece of unpacked data and a LBA of the first piece of unpacked data stored in the target cache module; and determining whether the relative offset parameter is equal to the difference to obtain the determination result.

In the above optional implementation, the generating a target marking parameter of the target cache module according to the determination result comprises: generating a first marking parameter in a case where the relative offset parameter is equal to the difference, wherein the first marking parameter is configured to indicate that the plurality of LBAs are consecutive; and generating a second marking parameter in a case where the relative offset parameter is not equal to the difference, wherein the second marking parameter is configured to indicate that a LBA of a first piece of written data among the plurality of pieces of written data and a LBA of a second piece of written data among the plurality of pieces of written data are not consecutive, and the first write data and the second write data are two pieces of unpacked data adjacent in the splitting order.

In some embodiments, when the CCB is allocated to each piece of 4 KB data, the relative offset of the 4 KB data in the CCB is recorded as cache_entry_offset, which takes a value between 0 and 11. The value of cache_entry_offset corresponding to the 4 KB data is determined. If the value of cache_entry_offset is 0, it indicates that the data is the first piece of 4 KB data in the CCB, and there is no need to determine the continuity or modify the value of the flag. It is directly determined whether the CCB is fully stored. If the value of cache_entry_offset is not 0, it indicates that the data is not the first piece of 4 KB data in the CCB. At this time, the value of the LBA recorded in the cache entry of the data may be subtracted from the value of first_lba, and the difference may be compared with cache_entry_offset. If they are equal, it indicates that the LBA and the LBA of the previous piece of 4 KB data are consecutive, and there is no need to modify the value of the flag. If they are not equal, the value of the flag corresponding to the CCB is cleared to 0, and then it is determined whether the CCB is fully stored. If the CCB is fully stored, the CCB is directly sent to the WM module.

In S204, storing the plurality of pieces of written data in the buffer into a solid-state storage unit of the SSD.

In some embodiments, the L2P table needs to be modified twice in the data writing process of the SSD, and the second time is to write the data from the buffer to the NAND, that is, the WM module allocates the PBA to the LBA according to the received LBA, and then the WM module writes the data in the NAND according to the PBA, and points the L2P table to the NAND address through the table modification operation.

In S206, determining whether the plurality of LBAs are consecutive to obtain a determination result.

In some embodiments, the WM module determines whether the LBAs in one CCB are consecutive. If it is identified that the LBAs in one CCB are consecutive, there is no need to iterate through each piece of write data and the LBA thereof in the CCB, and there is no need to read the LBA from the DRAM each time for comparison. Instead, the LBA in the CCB may be used to directly generate the above mapping table at one time. Otherwise, the L2P table may be pointed to the NAND address by modifying the table according to the method in the related art.

In some optional implementations, the determining whether the plurality of LBAs are consecutive comprises: determining whether the target marking parameter indicates that the plurality of LBAs are consecutive.

In the above optional implementation, the determining whether the target marking parameter indicates that the plurality of LBAs are consecutive comprises: determining whether the target marking parameter meets a preset condition, wherein the preset condition comprises one of the following: the target marking parameter is the first marking parameter, wherein the first marking parameter is configured to indicate that the plurality of LBAs are consecutive; the target marking parameter is the second marking parameter, wherein the second marking parameter is configured to indicate that the plurality of LBAs are not consecutive.

In some embodiments, the DM module identifies whether the LBAs in one CCB are consecutive in the unpacking process of each piece of 4 KB data. Once identified, the DM module directly informs the WM module of the continuity of the LBAs in the CCB through the flag. When the WM module modifies the table, the WM module first determines whether the LBAs in the CCB are consecutive according to the flag, if so, there is no need to iterate through each piece of write data and the LBA thereof in the CCB again, and there is no need to read the LBA from the DRAM each time for comparison. Instead, the LBA in the CCB may be used to directly generate the mapping table for pointing to the NAND address at one time. Otherwise, the table is modified according to the method in the related art.

In S208 and S210, in a case where the determination result indicates that the plurality of LBAs are consecutive, acquiring a Physics Block Address (PBA) of each of the plurality of pieces of written data in the solid-state storage unit to obtain a plurality of Physics Block Addresses (PBAs); and generating a target mapping table according to the plurality of LBAs and the plurality of PBAs, wherein the target mapping table is configured to map the plurality of LBAs to the plurality of PBAs.

In some optional implementations, the generating a target mapping table according to the plurality of LBAs and the plurality of PBAs comprises: updating the first mapping table according to the plurality of PBAs which comprise the PBA of each of the plurality of pieces of written data in the solid-state storage unit to obtain the target mapping table.

In some embodiments, the WM module allocates the PBA to the LBA according to the received LBA, and then writes the data in the NAND according to the PBA. When the WM module finishes writing the data and modifies the table, the WM module first determines the flag corresponding to the CCB. If the flag is 1, the 12 old PBAs may be directly read out from the L2P table, and after a new PBA is generated, the 12 new PBAs may be updated to the L2P table, so that the WM module may reduce 12 cycle and comparison determinations when each CCB is processed. If the WM module identifies that the flag in the CCB is 0, the WM module continues to perform the above table modification operation in the related art, first iterating through and determining, and modifying the table once every time the maximum consecutive LBA is found until the table with 12 pieces of 4 KB data is modified.

The present embodiment uses the above optional implementation, so that the WM module may preferentially determine the flag transferred by the DM module when modifying the table, and if the flag is 1, the WM module may complete the table modification operation at one time without performing cycle determination, thereby enabling the WM module to save a large number of cycle determinations and accesses to the DRAM in the consecutive write scenario, while reducing the lock holding time.

Figure 3:
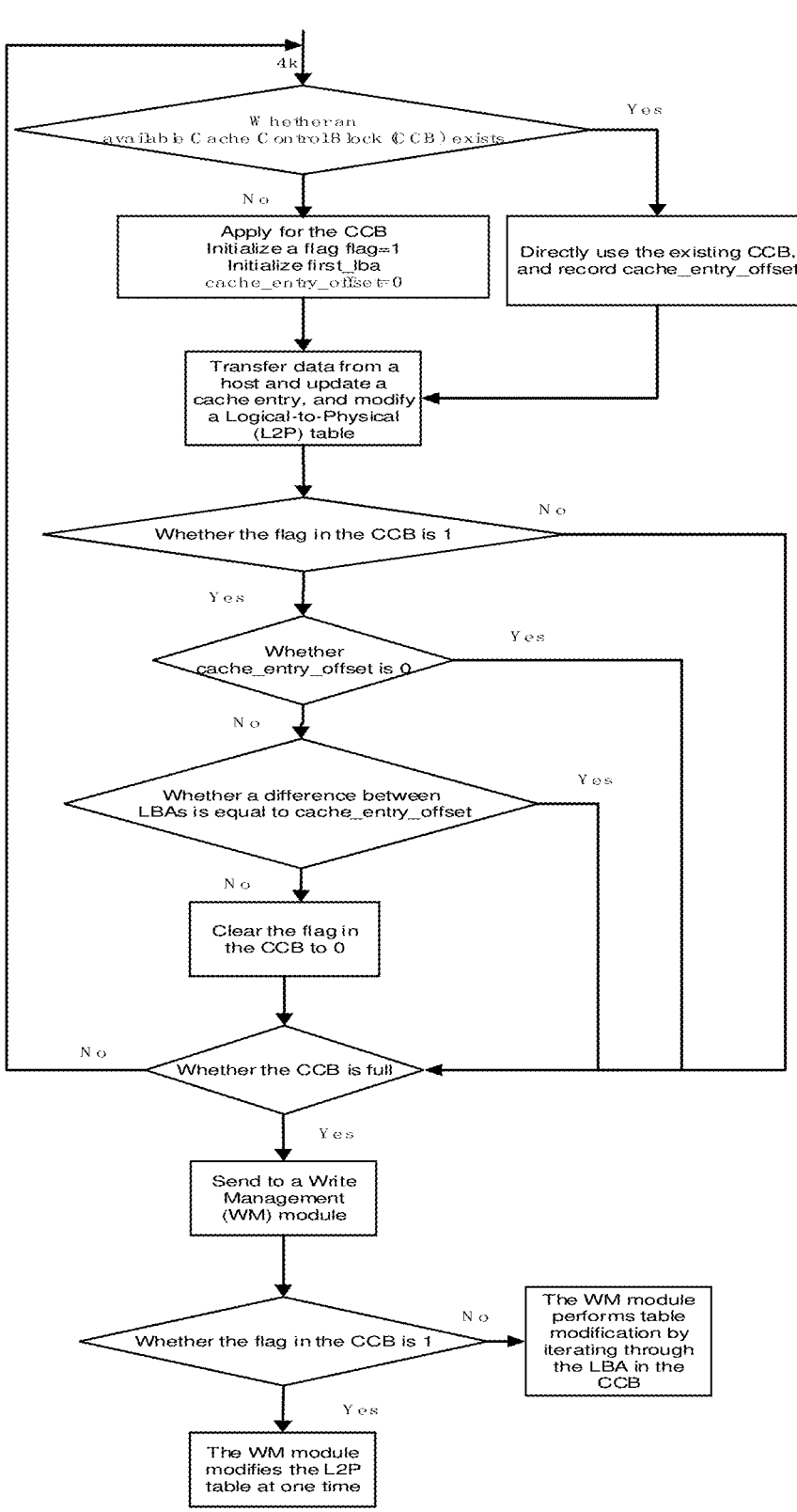
FIG. 3 is a flowchart of another method for writing data to a SSD according to an embodiment of the present disclosure.

Hereinafter, the method for writing data for the SSD in the present embodiment will be further described in conjunction with an optional example. As shown in FIG. 3, the method comprises the following steps.

1) After a piece of 4 KB data is split, it is determined whether the available CCB exists in the current buffer, if so, the existing CCB is directly used, and a relative offset of the 4 KB data in the CCB is recorded as cache_entry_offset, which takes a value between 0 and 11.

2) If the available CCB does not exist in the current buffer, a new CCB is applied for, that is, the first piece of 4 KB data in each CCB is used to apply for the CCB, and others do not need to apply. The CCB applied for by the first piece of 4 KB data is directly used, and other CCBs are used sequentially thereafter. When the first piece of 4 KB data applies for the CCB, the flag is initialized to 1, which indicates that the 12 LBAs are consecutive by default. At the same time, first_lba is initialized and cache_entry_offset is set to 0.

3) When the CCB is allocated to each piece of 4 KB data, the relative offset of the 4 KB data in the CCB is recorded as cache_entry_offset, which takes a value between 0 and 11.

4) After the data is transferred from the host to the buffer, the cache entry starts to be updated, the L2P table is modified, and then the value of the flag is determined. If the value is 0, it indicates that the LBAs in the CCB are not consecutive, S7) is directly executed, otherwise S5) is continued.

5) The value of cache_entry_offset corresponding to the 4 KB data is determined. If the value of cache_entry_offset is 0, it indicates that the data is the first piece of 4 KB data in the CCB, and there is no need to determine the continuity or modify the value of the flag, S7) is directly executed, otherwise S6) is continued.

6) If the value of cache_entry_offset is not 0, it indicates that the data is not the first piece of 4 KB data in the CCB. At this time, it is necessary to subtract the value of the LBA recorded in the cache entry of the data from the value of first_lba, and compare the difference with cache_entry_offset. If they are equal, it indicates that the LBAs are consecutive, and there is no need to modify the value of the flag. If they are not equal, the value of the flag is cleared to 0.

7) Each time a piece of 4 KB data is processed, it is necessary to determine whether the CCB is fully stored, if so, the CCB is directly sent to the WM module, otherwise the CCB is sent after being fully stored.

8) When the WM module finishes writing the data and modifies the table, the WM module first determines the flag in the CCB. If the flag is 1, 12 PBAs are read from the L2P table at one time. After a new PBA is generated, 12 new PBAs are updated to the L2P table.

9) If the WM module identifies that the flag in the CCB is 0, the WM module continues to perform the table modification operation in the related art, first iterating through and determining, and modifying the table once every time the maximum consecutive LBA is found until the table with 12 pieces of 4 KB data is modified.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the present disclosure, which is essential or contributes to the related art, may be embodied in the form of a software product. The computer software product is stored in a non-volatile readable storage medium (such as a Read-Only Memory (ROM)/ RAM, a magnetic disk and an optical disc), comprising a number of instructions for causing a terminal device (which may be a mobile phone, a computer, a server, or a network device, etc.) to perform the methods described in various embodiments of the present disclosure.

In the present embodiment, an apparatus for writing data to a SSD is further provided. The apparatus is configured to implement the above embodiments and optional implementations. The embodiments and optional implementations that have been elaborated will not be repeated here. The term "module" used below can realize a combination of software and/or hardware with an intended function. Although the apparatus described in the following embodiment is preferably realized by software, but by hardware or a combination of software and hardware is also possible and conceived.

Figure 4:
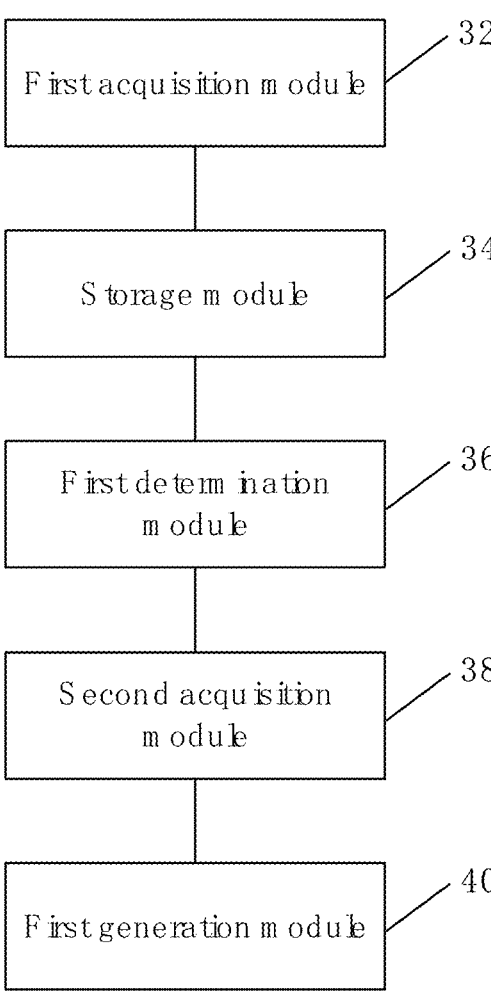
FIG. 4 is a structural block diagram of an apparatus for writing data to a SSD according to an embodiment of the present disclosure.

FIG. 4 is a structural block diagram of an apparatus for writing data to a SSD according to an embodiment of the present disclosure. As shown in FIG. 4, the apparatus comprises a first acquisition module 32, a storage module 34, a first determination module 36, a second acquisition module 38, and a first generation module 40.

The first acquisition module 32 is configured to acquire a Logical Block Address (LBA) of each of a plurality of pieces of written data stored into a target cache module to obtain a plurality of Logical Block Addresses (LBAs), wherein the target cache module is located in a buffer of the SSD.

The storage module 34 is configured to store the plurality of pieces of written data in the buffer into a solid-state storage unit of the SSD.

The first determination module 36 is configured to determine whether the plurality of LBAs are consecutive to obtain a determination result.

The second acquisition module 38 is configured to, in a case where the determination result indicates that the plurality of LBAs are consecutive, acquire a Physics Block Address (PBA) of each of the plurality of pieces of written data in the solid-state storage unit to obtain a plurality of Physics Block Addresses (PBAs).

The first generation module 40 is configured to a target mapping table according to the plurality of LBAs and the plurality of PBAs, wherein the target mapping table is configured to map the plurality of LBAs to the plurality of PBAs.

It is to be noted that, each of the above modules may be realized by software or hardware. For the latter, the each of the above modules may be realized by, but is not limited to, the following way: all of the above modules are in the same processor; or, the above modules are respectively in different processors in form of any combination.

In the present embodiment, through the above modules, based on the characteristic that the LBAs in the CCB in the write operation process of the SSD are consecutive, and the characteristic that the data packet carried by the command needs to be split into the plurality of pieces of written data for processing in the write operation process, it is first identified whether the LBAs in the CCB are consecutive, if so, there is no need to iterate through each piece of write data and the LBA thereof in the CCB, and there is no need to read the LBA from the DRAM each time for comparison, but the above mapping table may be directly generated at one time using the LBAs in the CCB. Therefore, the problem in the related art that a large number of cycle determinations and accesses to the DRAM greatly affect the write operation performance of the SSD may be solved, and the effect of improving the write operation performance of the SSD may be achieved.

In some optional implementations, the first acquisition module 32 comprises: a first acquisition sub-module, configured to acquire, from a host, a data packet carried by a target command, and a LBA of each of a plurality of pieces of data in the data packet; a first storage sub-module, configured to store the data packet and the LBA of each of the plurality of pieces of data in the data packet into at least one cache module in the buffer, wherein the at least one cache module comprises the target cache module; and a second acquisition sub-module, configured to acquire a LBA of each of a plurality of pieces of data stored into the target cache module to obtain the plurality of LBAs.

In some optional implementations, the above apparatus in the present embodiment further comprises: a splitting module, configured to split the plurality of pieces of data in the data packet one by one to obtain a plurality of pieces of unpacked data; a second determination module, configured to determine, according to a splitting order of the plurality of pieces of unpacked data, whether a LBA of a target piece of unpacked data among the plurality of pieces of unpacked data and a LBA of a previous piece of unpacked data are consecutive to obtain the determination result; and a generation module, configured to generate a target marking parameter of the target cache module according to the determination result, wherein the target marking parameter is configured to indicate whether the LBA of the target piece of unpacked data and the LBA of the previous piece of unpacked data are consecutive.

In some optional implementations, the second determination module is further configured to determine, according to the splitting order of the plurality of pieces of unpacked data, whether a LBA of the Nth piece of unpacked data among the plurality of pieces of unpacked data and a LBA of the (N−1)th piece of unpacked data among the plurality of pieces of unpacked data are consecutive to obtain the determination result.

In some optional implementations, the generation module comprises: a first update sub-module, configured to update, according to the determination result, a previous marking parameter of the target cache module to the target marking parameter, wherein the previous marking parameter is configured to indicate whether the LBA of the (N−1)th piece of unpacked data among the plurality of pieces of unpacked data and a LBA of the (N−2)th piece of unpacked data among the plurality of pieces of unpacked data are consecutive.

In some optional implementations, the first update sub-module comprises: a first generation sub-module, configured to, in a case where a first determination result is obtained, generate a first marking parameter according to the first determination result, and updating the previous marking parameter to the first marking parameter, wherein the first determination result is the determination result obtained in a case where the LBA of the Nth piece of unpacked data and the LBA of the (N−1)th piece of unpacked data are consecutive; and a second generation sub-module, configured to, in a case where a second determination result is obtained, generate a second marking parameter according to the second determination result, and updating the previous marking parameter to the second marking parameter, wherein the second determination result is the determination result obtained in a case where the LBA of the Nth piece of unpacked data and the LBA of the (N−1)th piece of unpacked data are not consecutive.

In some optional implementations, the splitting module is further configured to split the plurality of pieces of data in the data packet one by one to obtain the plurality of pieces of unpacked data of the same size.

In some optional implementations, the first storage sub-module comprises: a second storage sub-module, configured to store, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data.

In one optional implementation, the second storage sub-module comprises: a third storage sub-module, configured to store the target piece of unpacked data and the LBA of the target piece of unpacked data into the target cache module; a first determination sub-module, configured to determine whether a quantity of unpacked data currently stored into the target cache module reaches the preset quantity; a fourth storage sub-module, configured to, in a case where the quantity of unpacked data currently stored into the target cache module does not reach the preset quantity, store, according to the splitting order of the plurality of pieces of unpacked data, a next piece of unpacked data of the target piece of unpacked data and a LBA of the next piece of unpacked data into the target cache module; and a stopping sub-module, configured to, in a case where the quantity of unpacked data currently stored into the target cache module reaches the preset quantity, stop a storage operation of the target cache module, the target cache module storing the plurality of pieces of written data.

In some optional implementation, the first storage sub-module further configured to determine the present quantity according to a storage capacity of the target cache module and a size of each of the plurality of pieces of unpacked data.

In some optional implementations, the second storage sub-module comprises: a second determination sub-module, configured to determine, after a piece of unpacked data is split out from the plurality of pieces of data in the data packet each time, whether an available cache module exists in the at least one cache module, wherein the available cache module is a cache module having available storage space; a first determination sub-module, configured to, in a case where the available cache module exists in the at least one cache module, determine that the available cache module is the target cache module; and a fifth storage sub-module, configured to store the piece of unpacked data split out from the plurality of pieces of data in the data packet and a LBA of the piece of unpacked data into the target cache module, wherein the plurality of pieces of written data comprise the stored the piece of unpacked data and the stored LBA of the piece of unpacked data.

In some optional implementations, the second storage sub-module further comprises: a third generation sub-module, configured to, in a case where the available cache module does not exist in the at least one cache module, generate an application request; a fourth generation sub-module, configured to generate, according to the application request, a new cache module in the buffer to obtain the target cache module; and a sixth storage sub-module, configured to store the unpacked data split out from the plurality of pieces of data in the data packet into the new cache module to obtain written data stored in the target cache module.

In some optional implementations, the second storage sub-module further configured to after generate the new cache module, initialize the new cache module to obtain the target cache module, wherein the target cache module has a first marking parameter, and the first marking parameter is configured to indicate that the plurality of LBAs are consecutive.

In some optional implementations, the second determination module comprises: a recording sub-module, configured to, after storing the target piece of unpacked data split out from the plurality of pieces of data in the data packet and the LBA of the target piece of unpacked data into the target cache module, record a relative offset parameter of the target piece of unpacked data in the target cache module, wherein the relative offset parameter indicates the quantity of pieces of unpacked data stored in the target cache module before the target piece of unpacked data in a storing order; a calculation sub-module, configured to calculate a difference between the LBA of the target piece of unpacked data and a LBA of the first piece of unpacked data stored in the target cache module; and a third determination sub-module, configured to determine whether the relative offset parameter is equal to the difference to obtain the determination result.

In some optional implementations, the generation module comprises: a fifth generation sub-module, configured to generate a first marking parameter in a case where the relative offset parameter is equal to the difference, wherein the first marking parameter is configured to indicate that the plurality of LBAs are consecutive; and a sixth generation sub-module, configured to generate a second marking parameter in a case where the relative offset parameter is not equal to the difference, wherein the second marking parameter is configured to indicate that a LBA of a first piece of written data among the plurality of pieces of written data and a LBA of a second piece of written data among the plurality of pieces of written data are not consecutive, and the first write data and the second write data are two pieces of unpacked data adjacent in the splitting order.

In some optional implementations, the first determination module comprises: a fourth determination sub-module, configured to determine whether the target marking parameter indicates that the plurality of LBAs are consecutive.

In some optional implementations, the fourth determination sub-module comprises: a fifth determination sub-module, configured to determine whether the target marking parameter meets a preset condition, wherein the preset condition comprises one of the following: the target marking parameter is the first marking parameter, wherein the first marking parameter is configured to indicate that the plurality of LBAs are consecutive; the target marking parameter is the second marking parameter, wherein the second marking parameter is configured to indicate that the plurality of LBAs are not consecutive.

In one exemplary embodiment, the above apparatus in the present embodiment further comprises: a third acquisition module, configured to acquire a PBA of each of the plurality of pieces of written data in the buffer to obtain a plurality of PBAs which comprise the PBA of each of the plurality of pieces of written data in the buffer; and a second generation module, configured to generate a first mapping table according to the plurality of LBAs and the plurality of PBAs which comprise the PBA of each of the plurality of pieces of written data in the buffer, the first mapping table being configured to map the plurality of LBAs to the plurality of PBAs which comprise the PBA of each of the plurality of pieces of written data in the buffer.

In some optional implementations, the first generation module comprises: updating the first mapping table according to the plurality of PBAs which comprise the PBA of each of the plurality of pieces of written data in the solid-state storage unit to obtain the target mapping table.

The embodiments of the present disclosure further provide a non-volatile readable storage medium, in which a computer program is stored. The computer program is configured to execute the steps in any one of the above method embodiments when running.

In one exemplary embodiment, the above non-volatile readable storage medium may include, but is not limited to, a U disk, an ROM, an RAM, a mobile hard disk, a magnetic disk, a compact disc, and other media capable of storing the computer program.

The embodiments of the present disclosure further provide an SSD, comprising a memory and a processor. A computer program is stored in the memory, and the processor is configured to run the computer program to execute the steps in any of the above method embodiments.

In one exemplary embodiment, the above SSD may further include a transmission device and an input/output device. The transmission device is connected with the above processor, and the input/output device is connected to the above processor.

The optional examples in the present embodiment may refer to the above embodiments and the examples described in the exemplary implementations, which will not be elaborated herein.

It is apparent that those skilled in the art should appreciate that the above modules and steps of the present disclosure may be implemented by a general-purpose computing apparatus, and they may be centralized in a single computing apparatus or distributed on a network composed of multiple computing apparatuses; they may be implemented by a program code which is capable of being executed by the computing apparatus, so that they may be stored in a storage apparatus and executed by the computing apparatus; and in some situations, the presented or described steps may be executed in an order different from that described here; or they are made into integrated circuit modules, respectively; or multiple modules and steps of them are made into a single integrated circuit module to realize. In this way, the present disclosure is not limited to any particular combination of hardware and software.

The above are only the optional embodiments of the present disclosure, and are not intended to limit the present disclosure, and for those of ordinary skill in the art, various modifications and changes may be made to the present disclosure. Any modifications, equivalent substitutions, improvements, etc. within the principle of the present disclosure shall be included in the scope of protection of the present disclosure.

The invention claimed is:

1. A method for writing data to a Solid State Disk (SSD), comprising:

acquiring a Logical Block Address (LBA) of each of a plurality of pieces of written data stored into a target cache module to obtain a plurality of Logical Block Addresses (LBAs), wherein the target cache module is located in a buffer of the SSD;

storing the plurality of pieces of written data in the buffer into a solid-state storage unit of the SSD;

determining whether the plurality of LBAs are consecutive to obtain a determination result;

in a case where the determination result indicates that the plurality of LBAs are consecutive, acquiring a Physics Block Address (PBA) of each of the plurality of pieces of written data in the solid-state storage unit to obtain a plurality of Physics Block Addresses (PBAs); and generating a target mapping table according to the plurality of LBAs and the plurality of PBAs, wherein the target mapping table is configured to map the plurality of LBAs to the plurality of PBAs.

2. The method according to claim 1, wherein the acquiring a LBA of each of a plurality of pieces of written data stored into a target cache module to obtain a plurality of LBAs, wherein the target cache module is located in a buffer of the SSD, comprises:

acquiring, from a host, a data packet carried by a target command, and a LBA of each of a plurality of pieces of data in the data packet;

storing the data packet and the LBA of each of the plurality of pieces of data in the data packet into at least one cache module in the buffer, wherein the at least one cache module comprises the target cache module; and acquiring a LBA of each of a plurality of pieces of data stored into the target cache module to obtain the plurality of LBAs.

3. The method according to claim 2, further comprising:

splitting the plurality of pieces of data in the data packet one by one to obtain a plurality of pieces of unpacked data;

determining, according to a splitting order of the plurality of pieces of unpacked data, whether a LBA of a target piece of unpacked data among the plurality of pieces of unpacked data and a LBA of a previous piece of unpacked data are consecutive to obtain the determination result; and generating a target marking parameter of the target cache module according to the determination result, wherein the target marking parameter is configured to indicate whether the LBA of the target piece of unpacked data and the LBA of the previous piece of unpacked data are consecutive.

4. The method according to claim 3, wherein the determining, according to a splitting order of the plurality of pieces of unpacked data, whether a LBA of a target piece of unpacked data among the plurality of pieces of unpacked data and a LBA of a previous piece of unpacked data are consecutive to obtain the determination result comprises:

determining, according to the splitting order of the plurality of pieces of unpacked data, whether a LBA of the Nth piece of unpacked data among the plurality of pieces of unpacked data and a LBA of the (N−1)th piece of unpacked data among the plurality of pieces of unpacked data are consecutive to obtain the determination result.

5. The method according to claim 4, wherein the generating a target marking parameter of the target cache module according to the determination result comprises:

updating, according to the determination result, a previous marking parameter of the target cache module to the target marking parameter, wherein the previous marking parameter is configured to indicate whether the LBA of the (N−1)th piece of unpacked data among the plurality of pieces of unpacked data and a LBA of the (N−2)th piece of unpacked data among the plurality of pieces of unpacked data are consecutive.

6. The method according to claim 5, wherein the updating, according to the determination result, a previous marking parameter of the target cache module to the target marking parameter comprises:

in a case where a first determination result is obtained, generating a first marking parameter according to the first determination result, and updating the previous marking parameter to the first marking parameter, wherein the first determination result is the determination result obtained in a case where the LBA of the Nth piece of unpacked data and the LBA of the (N−1)th piece of unpacked data are consecutive; and in a case where a second determination result is obtained, generating a second marking parameter according to the second determination result, and updating the previous marking parameter to the second marking parameter, wherein the second determination result is the determination result obtained in a case where the LBA of the Nth piece of unpacked data and the LBA of the (N−1)th piece of unpacked data are not consecutive.

7. The method according to claim 3, wherein the splitting the plurality of pieces of data in the data packet one by one to obtain a plurality of pieces of unpacked data comprises:

splitting the plurality of pieces of data in the data packet one by one to obtain the plurality of pieces of unpacked data of the same size.

8. The method according to claim 3, wherein the storing the data packet and the LBA of each of the plurality of pieces of data in the data packet into at least one cache module in the buffer comprises:

storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data.

9. The method according to claim 8, wherein the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data comprises:

storing the target piece of unpacked data and the LBA of the target piece of unpacked data into the target cache module;

determining whether a quantity of unpacked data currently stored into the target cache module reaches the preset quantity;

in a case where the quantity of unpacked data currently stored into the target cache module does not reach the preset quantity, storing, according to the splitting order of the plurality of pieces of unpacked data, a next piece of unpacked data of the target piece of unpacked data and a LBA of the next piece of unpacked data into the target cache module; and in a case where the quantity of unpacked data currently stored into the target cache module reaches the preset quantity, stopping a storage operation of the target cache module, the target cache module storing the plurality of pieces of written data.

10. The method according to claim 8, wherein the storing the data packet and the LBA of each of the plurality of pieces of data in the data packet into at least one cache module in the buffer further comprises:

determining the present quantity according to a storage capacity of the target cache module and a size of each of the plurality of pieces of unpacked data.

11. The method according to claim 8, wherein the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module, wherein the plurality of pieces of written data comprise the stored preset quantity of pieces of unpacked data and the stored LBA of each of the preset quantity of pieces of unpacked data, comprises:

determining, after a piece of unpacked data is split out from the plurality of pieces of data in the data packet each time, whether an available cache module exists in the at least one cache module, wherein the available cache module is a cache module having available storage space;

in a case where the available cache module exists in the at least one cache module, determining that the available cache module is the target cache module; and storing the piece of unpacked data split out from the plurality of pieces of data in the data packet and a LBA of the piece of unpacked data into the target cache module, wherein the plurality of pieces of written data comprise the stored the piece of unpacked data and the stored LBA of the piece of unpacked data.

12. The method according to claim 11, wherein the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data further comprises:

in a case where the available cache module does not exist in the at least one cache module, generating an application request;

generating, according to the application request, a new cache module in the buffer to obtain the target cache module; and storing the unpacked data split out from the plurality of pieces of data in the data packet into the new cache module to obtain written data stored in the target cache module.

13. The method according to claim 12, wherein the storing, according to the splitting order of the plurality of pieces of unpacked data, a preset quantity of pieces of unpacked data among the plurality of pieces of unpacked data and a LBA of each of the preset quantity of pieces of unpacked data one by one into the target cache module to obtain the plurality of pieces of written data further comprises:

after generating the new cache module, initializing the new cache module to obtain the target cache module, wherein the target cache module has a first marking parameter, and the first marking parameter is configured to indicate that the plurality of LBAs are consecutive.

14. The method according to claim 3, wherein the determining, according to a splitting order of the plurality of pieces of unpacked data, whether a LBA of a target piece of unpacked data among the plurality of pieces of unpacked data and a LBA of a previous piece of unpacked data are consecutive to obtain the determination result comprises:

after storing the target piece of unpacked data split out from the plurality of pieces of data in the data packet and the LBA of the target piece of unpacked data into the target cache module, recording a relative offset parameter of the target piece of unpacked data in the target cache module, wherein the relative offset parameter indicates the quantity of pieces of unpacked data stored in the target cache module before the target piece of unpacked data in a storing order;

calculating a difference between the LBA of the target piece of unpacked data and a LBA of the first piece of unpacked data stored in the target cache module; and determining whether the relative offset parameter is equal to the difference to obtain the determination result.

15. The method according to claim 14, wherein the generating a target marking parameter of the target cache module according to the determination result comprises:

generating a first marking parameter in a case where the relative offset parameter is equal to the difference, wherein the first marking parameter is configured to indicate that the plurality of LBAs are consecutive; and generating a second marking parameter in a case where the relative offset parameter is not equal to the difference, wherein the second marking parameter is configured to indicate that a LBA of a first piece of written data among the plurality of pieces of written data and a LBA of a second piece of written data among the plurality of pieces of written data are not consecutive, and the first write data and the second write data are two pieces of unpacked data adjacent in the splitting order.

16. The method according to claim 15, wherein the determining whether the plurality of LBAs are consecutive comprises:

determining whether the target marking parameter indicates that the plurality of LBAs are consecutive.

17. The method according to claim 16, wherein the determining whether the target marking parameter indicates that the plurality of LBAs are consecutive comprises:

determining whether the target marking parameter meets a preset condition, wherein the preset condition comprises one of the following:

the target marking parameter is the first marking parameter, wherein the first marking parameter is configured to indicate that the plurality of LBAs are consecutive;

the target marking parameter is the second marking parameter, wherein the second marking parameter is configured to indicate that the plurality of LBAs are not consecutive.

18. The method according to claim 1, further comprising:

acquiring a PBA of each of the plurality of pieces of written data in the buffer to obtain a plurality of PBAs which comprise the PBA of each of the plurality of pieces of written data in the buffer; and generating a first mapping table according to the plurality of LBAs and the plurality of PBAs which comprise the PBA of each of the plurality of pieces of written data in the buffer, wherein the first mapping table is configured to map the plurality of LBAs to the plurality of PBAs which comprise the PBA of each of the plurality of pieces of written data in the buffer.

19. A non-volatile readable storage medium, wherein a computer program is stored in the non-volatile readable storage medium, wherein the computer program is executed by a processor to implement the steps of the method according to claim 1.

20. A Solid State Disk (SSD), comprising a memory, a processor, and a computer program stored in the memory and executable on the processor, wherein the processor, when executing the computer program, implements the steps of the method according to claim 1.

* * * * *